(12) United States Patent
Gossweiler et al.

(10) Patent No.: US 8,180,583 B1
(45) Date of Patent: May 15, 2012

(54) METHODS AND SYSTEMS TO DETERMINE A CONTEXT OF A DEVICE

(75) Inventors: Rich Gossweiler, Sunnyvale, CA (US); James Brooks Miller, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/297,425

(22) Filed: Nov. 16, 2011

(51) Int. Cl.
*G01R 21/00* (2006.01)
(52) U.S. Cl. .......................................... 702/62
(58) Field of Classification Search ....... 702/62
See application file for complete search history.

(56) References Cited

U.S. PATENT DOCUMENTS

| | | | |
|---|---|---|---|
| 6,178,141 B1 * | 1/2001 | Duckworth et al. | 367/127 |
| 7,162,026 B2 | 1/2007 | Furnas | |
| 7,248,840 B2 | 7/2007 | Chien | |
| 2006/0152382 A1 | 7/2006 | Hiltunen | |
| 2007/0161410 A1 | 7/2007 | Huang | |
| 2008/0119217 A1 | 5/2008 | Coxhill | |

OTHER PUBLICATIONS

Pocket, Bag, Hand, etc.—Automatically Detecting Phone Context through Discovery, Emiliano Miluzzo, Michela Papandrea, Nicholas D. Lane, Hong Lu, Andrew T. Campbell, In Proc. of First International Workshop on Sensing for App Phones (PhoneSense'10), Zurich, Switzerland, Nov. 2, 2010.

* cited by examiner

*Primary Examiner* — Tung S Lau
(74) *Attorney, Agent, or Firm* — McDonnell Boehnen Hulbert & Berghoff LLP

(57) ABSTRACT

Methods and systems for determining that a device is currently within a given context are described. A device may include multiple sensors coupled to the device. A sensor utility value combining a rate of power consumption for a sensor and an accuracy score indicating a degree to which the sensor may provide outputs indicative of the device being currently in the given context may be determined for each sensor. Based on sensor utility values, the multiple sensors coupled to the device may be ranked. A sensor may be identified based on a ranking of the sensor. A probability associated with a determination that the device is currently within the given context may be assigned to the sensor. More sensors may be identified to determine with increasing probability and increasing power requirements that the device is currently within the given context.

23 Claims, 5 Drawing Sheets

COMPUTER PROGRAM PRODUCT 600

SIGNAL BEARING MEDIUM 601

PROGRAM INSTRUCTIONS 602

- DETERMINING, FOR EACH SENSOR OF A SUBSET OF SENSORS COUPLED TO A DEVICE, A RESPECTIVE RATE OF POWER CONSUMPTION FOR THAT SENSOR
- DETERMINING, FOR EACH SENSOR OF THE SUBSET OF SENSORS, A RESPECTIVE ACCURACY SCORE INDICATING A DEGREE TO WHICH INFORMATION ASSOCIATED WITH THAT SENSOR IS INDICATIVE OF A GIVEN CONTEXT
- FOR EACH SENSOR OF THE SUBSET OF SENSORS, DETERMINING A SENSOR UTILITY VALUE FOR THAT SENSOR, EACH RESPECTIVE SENSOR UTILITY VALUE BEING BASED AT LEAST IN PART ON THE RESPECTIVE RATE OF POWER CONSUMPTION FOR THAT SENSOR AND THE RESPECTIVE ACCURACY SCORE FOR THAT SENSOR
- IDENTIFYING, BASED ON THE SENSOR UTILITY VALUE FOR EACH SENSOR OF THE SUBSET OF SENSORS, A GIVEN SENSOR
- RECEIVING INFORMATION OUTPUT BY THE GIVEN SENSOR;
- DETERMINING, BASED ON THE INFORMATION OUTPUT BY THE GIVEN SENSOR, A PROBABILITY THAT THE DEVICE IS CURRENTLY WITHIN THE GIVEN CONTEXT
- DETERMINING THAT THE DEVICE IS CURRENTLY WITHIN THE GIVEN CONTEXT WHEN THE PROBABILITY EXCEEDS A PREDETERMINED THRESHOLD

| COMPUTER READABLE MEDIUM 603 | COMPUTER RECORDABLE MEDIUM 604 | COMMUNICATIONS MEDIUM 605 |

FIGURE 6

METHODS AND SYSTEMS TO DETERMINE A CONTEXT OF A DEVICE

BACKGROUND

In computing, context awareness refers to the ability of a computing device (such as a mobile computing device) to detect one or more attributes of its current environment. In some instances, such a device may detect and/or receive information about its present circumstances, and based on a predetermined set of one or more rules or policies, perform one or more operations, provide predetermined functionality, etc.

As an example, a mobile phone may be equipped with a global positioning system (GPS) antenna configured to provide information about a current location of the mobile phone. In the example, the mobile phone may tailor data output and/or functionality provided by an application executing at the mobile phone based at least in part on the mobile phone's current location. More specifically, a weather application executing at the mobile phone may—without the user entering location information—output weather information associated with the current location of the mobile phone.

SUMMARY

The present application discloses systems and methods to determine whether a computing device (e.g., a mobile computing device) is currently located, situated, and/or present at and/or within a given context. In some embodiments, the systems and methods can determine whether a computing device is currently not located, situated, and/or present at and/or within a given context. In one aspect, a method is described. The method may comprise determining, for each sensor of a subset of sensors coupled to a device, a respective rate of power consumption for that sensor. The method may also comprise determining, for each sensor of the subset of sensors, a respective accuracy score. The respective accuracy score can indicate a degree to which information associated with that sensor is indicative of a given context. The method may further comprise for each sensor of the subset of sensors, determining a sensor utility value, each respective sensor utility value being based in at least in part on the respective rate of power consumption for that sensor and the accuracy score for that sensor. Based on the sensor utility value for each sensor of the subset of sensors, the method may further comprise identifying a given sensor and receiving information output by the given sensor. Based on the information output by the given sensor, the method may also comprise determining a probability that the device is currently within the given context. When the probability exceeds a predetermined threshold, the method may further comprise determining that the device is currently within the given context.

In another aspect, a non-transitory computer readable medium having stored thereon instructions executable by a computing device to cause the computing device to perform functions is described. The functions may comprise determining, for each sensor of a subset of sensors coupled to a device, a respective rate of power consumption for that sensor. The functions may also comprise determining, for each sensor of the subset of sensors, a respective accuracy score. The respective accuracy score can indicate a degree to which information associated with that sensor is indicative of a given context. The functions may further comprise for each sensor of the subset of sensors, determining a sensor utility value, each respective sensor utility value being based in part on the respective rate of power consumption for that sensor and the respective accuracy score for that sensor. Based on the sensor utility value for each sensor of the subset of sensors, the functions may further comprise identifying a given sensor and receiving information output by the given sensor. Based on the information output by the given sensor, the functions may also comprise determining a probability associated with a determination that the device is currently within the given context. When the probability exceeds a predetermined threshold, the functions may further comprise determining that the device is currently within the given context.

In still another aspect, a system is described. The system comprises a utility function module and a probability module. The utility function module may be configured to receive, for each sensor of a subset of sensors coupled to a device, information associated with a respective rate of power consumption for that sensor and for each sensor to the subset of sensors, receive a respective accuracy score. The respective accuracy score can indicate a degree to which information associated with that sensor is indicative of a given context. The utility function module may also be configured to determine a sensor utility value for each sensor of the subset of sensors, each respective sensor utility value being based at least in part on the respective rate of power consumption for that sensor and the accuracy score for that sensor. The probability module may be in communication with the utility function module and may be configured to identify, based on the sensor utility value for each sensor of the subset of sensors, a given sensor and receive information output by the given sensor. Based on the information output by the given sensor, the probability module may be configured to determine a probability that the device is currently within the given context. When the probability exceeds a predetermined threshold, the probability module may be configured to determine that the device is currently within the given context.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 6 is a schematic illustrating a conceptual partial view of an example computer program product that includes a computer program for executing a computer process on a computing device, arranged according to at least some embodiments presented herein.

DETAILED DESCRIPTION

Figure 1:
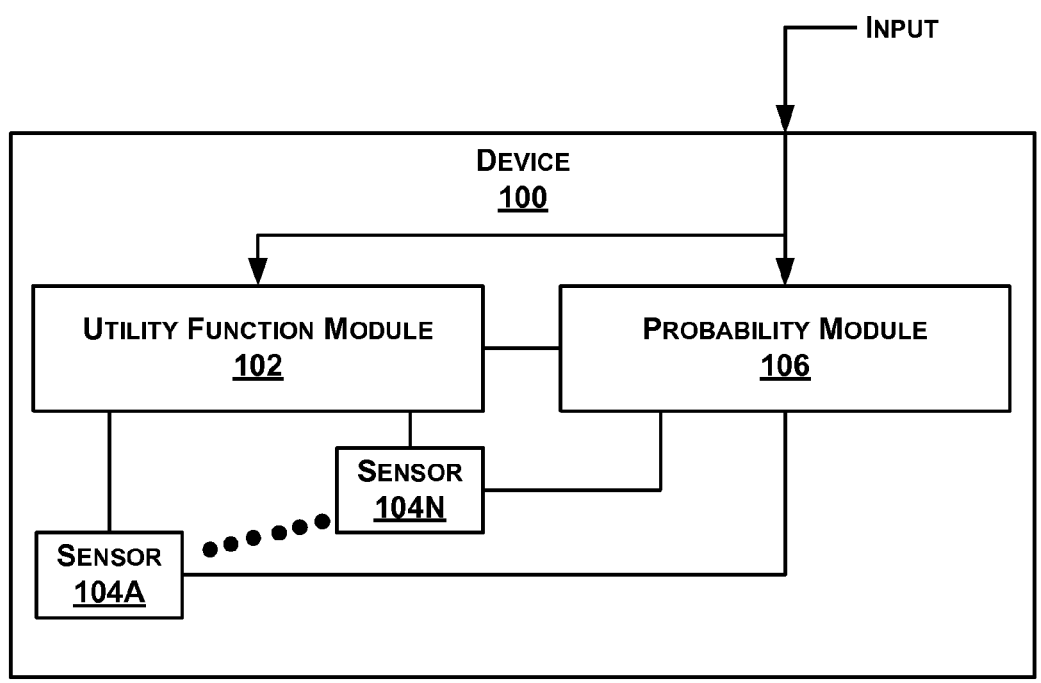
FIG. 1 is a block diagram illustrating an example device, in accordance with at least some embodiments described herein.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

This disclosure may disclose, inter alia, systems and methods for determining that a device is within a given context. A device may include multiple sensors coupled to the device. A sensor utility value combining a rate of power consumption for the sensor and an accuracy score indicating a degree to which a respective sensor may provide outputs indicative of the device being in the given context may be determined for each sensor. Based on sensor utility values, the multiple sensors coupled to the device may be ranked. A sensor may be identified based on a ranking of the sensor. A probability associated with a determination that the device is within the given context may be assigned to the sensor. More sensors may be used to determine with increasing probability and increasing power requirements that the device is currently within the given context.

In some examples, a device may include multiple sensors performing continuous real-time sensing of various parameters (e.g., device location, acceleration, rotation, etc.). A processor coupled to the device may be configured to receive information from the multiple sensors and to perform computations that allow the device to perform functions of the device properly. Continuous real-time sensing and computations performed by the processor may cause the device to consume power. Configuring the device to enable sensors, receive information from the sensors, and perform computations may cause the device to run more efficiently.

As a specific example, determining that the device is within a given context (e.g., an environment and location of the device such as in a pocket of a user, in a hand of a user, inside a backpack, on a hip of a user, arm mounted, in a conference room, etc.) may allow the device to be configured to run in a manner tailored for the given context. A mobile phone that determines the given context of the mobile phone to be a conference room may reject or ignore incoming calls, for example. In another example, a user may not be benefiting from operation of a Global Positioning System (GPS) module while the device is in the pocket of the user. If the device determines that the device may be in a pocket of a user, the device may disable the GPS antenna/module to save power. Determining that the device is within the given context may allow the device to disable sensors consuming power when the given context may be unsuitable. The device may also enable sensors and features upon detecting suitability of the given context.

The context of the device can be determined by receiving information output by a sensor or multiple sensors coupled to the device. In one example, information received from one sensor may be enough to determine that the device is currently within a given context. In another example, multiple sensors or a subset of sensors coupled to the device may be used to determine that the device is currently within the given context. For example, a camera or a light sensor coupled to the device may not be able to distinguish if the device may be in a pocket of a user or may be positioned on a surface in a dark environment or covered by the surface on which the device may be positioned. Another sensor such as an accelerometer may be used to confirm or increase a probability of determining that the device may be in the pocket of the user by detecting an amount of motion, for example.

The multiple sensors coupled to the device may be ranked according to power consumption and accuracy level with which a sensor may provide information indicative of the device being in the given context. A camera, for example, may consume more power than a gyroscope, but the camera may be more definitive than the gyroscope in determining a given context. To determine the context, the device may, for example, use information associated with a first sensor that may rank low in power consumption indicating that the first sensor consumes less power than other sensors. Information output by the first sensor may not indicate conclusively or with a high probability that the device is within the given context, however. Information output by a second sensor may be used to indicate with an increased probability that the device is within the given context. The second sensor may rank higher than the first sensor in power consumption, but may also rank higher in accuracy level with which the information provided by second sensor may indicate that the device is within the given context. The combined information received from the first and second sensor may still not allow the device to determine that the device is currently within the given context conclusively. Information output by a third sensor may be used. Using information output by other sensors may continue until the device is determined to be within the given context conclusively or with a level of probability that exceeds a predetermined threshold.

Sensor ranking may change depending on inputs to the device. For example, a camera may provide information that may indicate with a higher accuracy that the device may be in a pocket of a user during the day than at night. The device may, for example, use an input from a clock to determine time of day and change a sensor ranking. In one example, the GPS module may indicate a location of the device including latitude and longitude. The device may receive information associated with sunset time for the latitude and longitude from a network. The device may use clock time and the information associated with sunset time and determine if an environment of the device may be dark or not and change sensor ranking accordingly. Change in sensor ranking may be referred to as dynamic ranking.

I. System for Determining a That a Device is Currently Within a Given Context

FIG. 1 is a block diagram illustrating an example device 100. The device 100 includes a utility function module 102 configured to receive information output by sensors 104A-N, which may be coupled to the device 100, and a probability module 106. The utility function module 102 and the probability module 106 may be in communication with each other. Inputs to the device 100 may be communicated to the utility function module 102 and the probability module 106. Inputs can be external or internal to the device 100. Multiple inputs may also be used. In some embodiments, the device 100 can be, for example, a mobile telephone, personal digital assistant (PDA), laptop, notebook, or netbook computer, tablet computing device, etc.

The utility function module 102 may be configured to determine a sensor utility value associated with one or more of the sensors 104A-N. The sensors 104A-N may comprise all sensors coupled to the device 100, or may comprise a subset of the sensors coupled to the device 100. Each of the sensors 104A-N consumes power when the respective sensor may be in use. The rate of power consumption for one sensor may be different than the rate of power consumption for other sensors. If the device 100 is a mobile phone, for example, sensors coupled to the mobile phone may include a camera and a gyroscope. The camera may consume more electrical power than a gyroscope, for example. Different devices may have different sensors and subsets of sensors. The utility function module 102 may be configured to determine types of sensors coupled to the device 100 and to determine respective sensor utility values accordingly.

Information output by each of the sensors 104A-N may allow the device 100 to determine a current context of the device 100 with a given level of accuracy. An accuracy score may be determined or assigned to each of the sensors 104A-N. The accuracy score may indicate a degree to which a given sensor may provide outputs indicative of the device 100 being currently with in a given context. The utility function module 102 may be configured to determine a sensor utility value associated with each of the sensors 104A-N. The sensor utility value may include a weighted combination of a rate of power consumption for a respective sensor and an accuracy score associated with the respective sensor. The sensor utility value may be computed by a mathematical expression as follows:

$$\text{Sensor Utility Value}(i) = \alpha . f(\text{rate of power consumption}(i) + \beta . f(\text{accuracy score}(i)) \quad \text{Equation (1)}$$

Equation (1) describes computation of a sensor utility value associated with a given sensor (i) that includes a weighted combination of a function of a rate of power consumption for the sensor (i) weighted by a factor $\alpha$ and a function of an accuracy score associated with the sensor (i) weighted by a factor $\beta$. The sensor utility value equation (1) may include other elements. For example, a sensor may be in use on the device and the processor may be receiving information from the sensor. An element may be added to equation (1) to increase a value of the sensor utility value for the sensor since using the sensor may not comprise enabling the sensor, which may consume an extra amount of power.

The sensor utility value equation (1) may include normalizing factors so as to establish an order of magnitude associated with elements of the equation (1) (e.g., rate of power consumption and accuracy score) such that none of the elements bias the sensor utility value. In another example, the function associated with the rate of power consumption for the sensor may include an inverse of the rate of power consumption for the sensor. In this example, the lower the rate of power consumption for the sensor, the higher the sensor utility value associated with the sensor.

Factors $\alpha$ and $\beta$ may be constants or variables that include a function of an input to the device 100. The accuracy score may also include a function of an input to the device 100. For example, a camera may provide information that may indicate e with a higher level of accuracy a given context of the device 100 during the day than at night. The device 100 may use an input from a clock to determine time of day and the utility function module 102 may be configured to change an accuracy score associated with the camera or change the factor $\beta$ or both accordingly. Therefore, the sensor utility value associated with a given sensor may vary as a function of the input to the device 100. The utility function module 102 may rank the sensors 104A-N based on respective sensor utility values associated with the sensors 104A-N. Ranking of the sensors 104A-N may be dynamic and may vary as a function of the input to the device 100.

The probability module 106 may be configured to receive information output by the sensors 104A-N either directly or through communication with the utility function module 102. Based on ranking of the sensors 104A-N, the probability module 106 may be configured to identify a given or a first sensor. The first sensor may be identified based on the sensor utility value associated with the first sensor determined by the utility function module 102. The first sensor may, for example, be associated with a lowest rate of power consumption when compared to rates of power consumption for other sensors coupled to the device 100. The probability module 106 may be configured to determine, based on the information output by the first sensor, a first probability associated with a determination that the device 100 is currently within the given context. For example, the first sensor may be an accelerometer coupled to a mobile phone. If the accelerometer indicates motion, the mobile phone may be in a pocket of a user but may also be in a hand of a user or affixed to a shoulder of a user while running. If the first probability assigned to the accelerometer by the probability module 106 does not exceed a first predetermined threshold, for example, the current context of the mobile phone may not be determined conclusively.

The probability module 106 may combine a probability that the device may be in the given context with a rate of power consumption for the first sensor to determine an effectiveness parameter associated with an effectiveness of the first sensor to determine that the device 100 is currently within the given context. The effectiveness parameter may be determined by the following equation:

$$\text{Effectiveness Parameter}(i) = \frac{P_i(\text{Context} = \text{true})}{\text{Amount of Power Consumed}(i)} \quad \text{Equation (2)}$$

Equation (2) describes an effectiveness parameter for a given sensor (i). The effectiveness parameter may be determined by dividing a probability $P_i$ that the device is in the given context (e.g., context=true) assigned to the sensor (i) based on information received from the sensor (i) by the rate of power consumption for the sensor (i). The higher the probability $P_i$ assigned to the sensor (i), the higher the effectiveness parameter associated with the sensor (i). Also, the lower the rate of power consumption for the sensor (i), the higher the effectiveness parameter associated with the sensor (i). In one example, the effectiveness parameter may be used to determine sensor ranking instead or in combination with the sensor utility value described in equation (1).

The probability module 106 may be configured to identify a second sensor. The second sensor may be identified based on the sensor utility value associated with the second sensor determined by the utility function module 102. The second sensor may also be identified based on an effectiveness parameter associated with the second sensor. The second sensor may consume more power than the first sensor but may provide information that may indicate the current context of the device with a higher probability. The probability module 106 may be configured to determine, based on the information output by the second sensor, a second probability associated with the determination that the device 100 is currently within the given context. For example, the second sensor coupled to the mobile phone may be a camera or a light sensor. If the information output by the camera or the light sensor indicates a dark environment and a time received from a clock input to the device 100 indicates day time, the probability module 106 may be configured to assign a high probability associated with the second sensor in determining the current context of the mobile phone.

The probability module 106 may be configured to combine the first probability and the second probability to determine a combined probability. For example, the probability module 106 may be configured to add the first probability and second probability to determine the combined probability. The probability module 106 may be configured to determine a weighted combination of the first probability and the second probability. Weights associated with the weighted combination of the first probability and the second probability may be fixed or may vary in correlation with inputs to the device 100. If the combined probability does not exceed a second predetermined threshold, then the device 100 being currently within the given context may not be conclusively determined. The probability module 106 may be configured to receive information from a third sensor and determine a third probability to be combined with the first probability and the second probability. More sensors may be used until the combined probability exceeds a predetermined threshold and the device 100 is determined to be currently within the given context.

The probability module 106 may be configured to average the combined probabilities over a predetermined period of time to filter noise or distortions that may be included in instantaneous combined probability information, for example. The operation or functionality of the device 100 may adapt to the device 100 being currently in the given context. For example, if the device 100 is a mobile phone determined to be in a pocket of a user, inside a backpack or purse, or other area in which the user may not be making use of the mobile phone, the mobile phone and applications executing at the mobile phone may adapt by disabling sensors and reducing functionality of the mobile phone, for example, and the phone may run more efficiently. In another example, when the context may be suitable, the device may enable sensors and increase functionality.

One or more of the described functions or components of the device 100 may be divided up into additional functional or physical components, or combined into fewer functional or physical components. In some further examples, additional functional and/or physical components may be added to the examples illustrated by FIG. 1. Still further, any of the utility function module 102 and the probability module 106 may include or be provided in the form of a processor (e.g., a microprocessor, a digital signal processor (DSP), etc.) configured to execute program code including one or more instructions for implementing logical functions described herein. The device 100 may further include any type of computer readable medium (non-transitory medium), for example, such as a storage device including a disk or hard drive, to store the program code. In other examples, the device 100 may be included within other systems.

II. Method to Determine That a Device is Currently Within a Given Context

Figure 2:
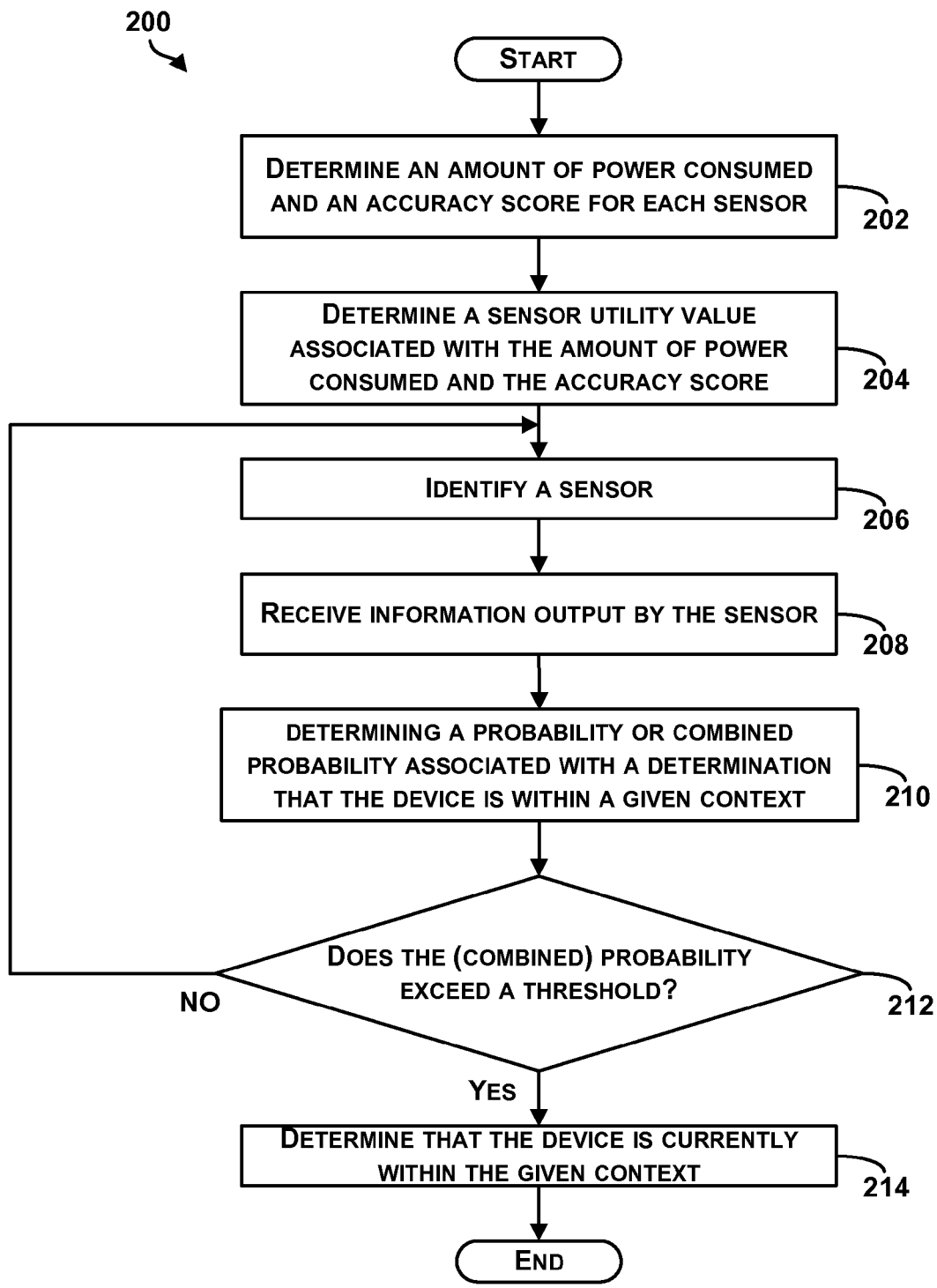
FIG. 2 is a flow chart illustrating an example method for determining that a device is currently within a given context.

FIG. 2 is a flow chart illustrating an example method 200 for determining that a device is currently within a given context.

Method 200 may include one or more operations, functions, or actions as illustrated by one or more of blocks 202, 204, 206, 208, 210, 212, and 214. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation In addition, for the method 200 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 200 and other processes and methods disclosed herein, each block in FIG. 2 may represent circuitry that is wired to perform the specific logical functions in the process.

At block 202, method 200 includes determine a rate of power consumption and an accuracy score for each sensor. Multiple sensors may be coupled to a device. Each sensor may consume an amount of power when in use. Information output by each sensor may be used to determine a current context of the device with a given level of accuracy. An accuracy score may be assigned to or determined for each sensor to indicate a degree to which a respective sensor may provide outputs indicative of the device being currently in a given context. The device may determine the rate of power consumption and the accuracy score for each sensor of a subset of the multiple sensors coupled to the device or the device may receive information associated with the rate of power consumption and the accuracy score for each sensor from a server, for example. The subset of sensors may be different for different devices. Depending on a configuration of the device including types and number of sensors coupled to the device, the subset of sensors may be determined.

At block 204, method 200 includes determine a sensor utility value associated with the rate of power consumption and the accuracy score. The device may include a processor. The processor may determine a sensor utility value for each sensor of the subset of sensors. The sensor utility value may include a weighted combination of a rate of power consumption for a respective sensor and an accuracy score associated with the respective sensor. The sensor utility value may be computed by a mathematical expression as described by equation (1) above.

Weights associated with the weighted combination of the rate of power consumption and the accuracy score of a sensor may vary in correlation with an input to the device. For example, a camera may be assigned a high accuracy score compared to other sensors in determining the current context of the device during the day than at night. The device may use an input from a clock to increase an accuracy score associated with the camera or change a weight associated with the accuracy score of the camera accordingly. Therefore, the sensor utility value associated with a given sensor may vary as a function of an input to the device. As shown in equation (1), the sensor utility value may include a function of the rate of power consumption and a function of the accuracy score associated with a sensor.

At block 206, method 200 includes identify a sensor. Based on sensor utility values associated with sensors coupled to the device, the sensors may be ranked. For example, the processor may compare the sensor utility values associated with the sensors and rank the sensors accordingly. Ranking of the sensors may be dynamic and vary as a function of an input or inputs to the device. Ranking may also vary accordingly to a configuration of the device including types and number of sensors associated with the device. Based on the ranking of the sensor the processor may identify a first sensor. The first sensor may, for example, be associated with a lowest rate of power consumption when compared to rate of power consumption associated with other sensors coupled to the device.

At block 208, method 200 includes receive information output by the sensor. For the first sensor identified at block 206, information output by the first sensor may be received. For example, the processor may enable the sensor to receive information output by the first sensor. For example if the first sensor identified is a light sensor, the processor may enable the light sensor and receive information associated with exposure of the device to light in the form of outputs from the sensor.

At block 210, method 200 includes determine a probability or combined probability associated with a determination that the device is currently within a given context. Based on the information output by the first sensor, a probability associated with a determination that the device is currently within the given context may be determined or assigned to the first sensor. For example, the first sensor may be a gyroscope coupled to a mobile phone. If the gyroscope indicates high rates of rotational motion, there may be a higher probability that the mobile phone may be affixed to a shoulder of a user while running than the probability that the mobile phone is in a pocket of a user. A processor coupled to the mobile phone may be configured to assign to the gyroscope a low probability that the mobile phone may be in a pocket of a user in this case, for example. The probability may be a numerical value (e.g., 0.2 out of a range of values between 0 and 1) or may be a qualitative description (e.g., "low"), for example.

At decision block 212, method 200 includes does the probability exceed a threshold to determine if the probability assigned to the first sensor exceeds a first threshold. The first threshold may be associated with the level of certainty of determining that the device is currently within the given context.

If the probability assigned to the first sensor exceeds the first threshold, the device may be determined to be currently within the given context at block 214 of the method 200, for example.

If the probability does not exceed the first threshold, the device being currently with the given context may not be determined conclusively. Method 200 may identify a second sensor at block 206. The second sensor may be identified based on the sensor utility value associated with the second sensor identified at block 204. The second sensor may consume a larger amount of power than the first sensor but may provide outputs indicative of the current context of the device with a higher probability than the first sensor. Information output by the second sensor may be received at block 208. Based on the information output by the second sensor, a second probability associated with the determination that the device is currently within the given context may be determined or assigned to the second sensor at block 210. For example, the second sensor coupled to the mobile phone may be a camera or a light sensor. If the information output by the camera or the light sensor indicates a dark environment and a time received from a clock associated with the device indicates day time, a high probability may be assigned to the second sensor that the current context of the mobile phone may be the pocket of the user or a backpack, for example.

At block 210, the method 200 may include combining the first probability and the second probability to determine a combined probability. For example, determining the combined probability may comprise adding the first probability and second probability. A weighted combination of the first probability and the second probability may also be determined. The weights may be fixed or may vary in correlation with an input to the device.

If the combined probability exceeds a second predetermined threshold at block 212 of the method 200, then the device may be determined to be currently within the given context with a high level of certainty. If not, a third sensor may be identified at block 206 and the method may be repeated. More sensors may be used until the combined probability exceeds a predetermined threshold and the device may be determined to be currently within the given context with a predetermined high level of certainty.

III. Inference Levels

Figure 3:
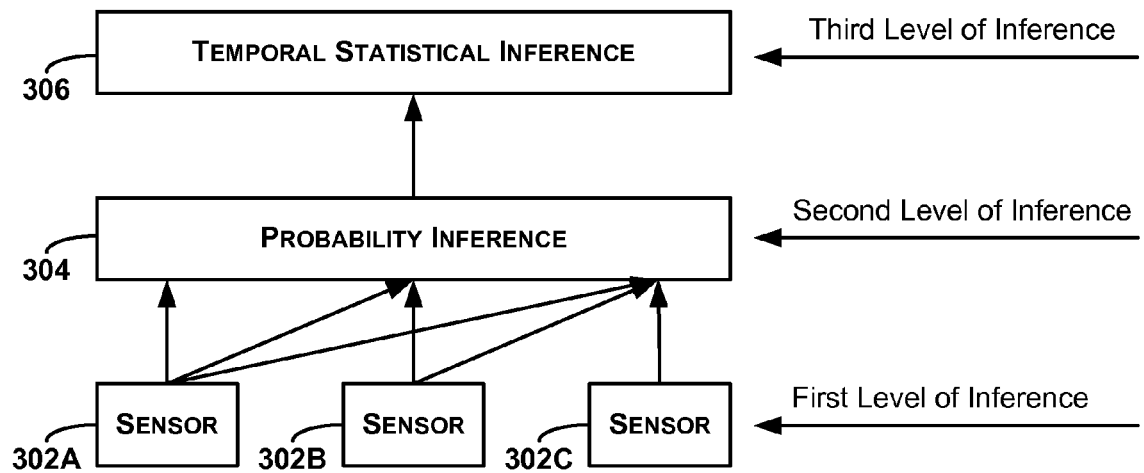
FIGS. 3 is a block diagram illustrating example inference levels included in determining that the device is currently within the given context.

In another example, determination that the device is currently within the given context may be described by one or more of three levels of inference. FIG. 3 is a block diagram illustrating example inference levels included in determining that the device is currently within the given context.

A first level of inference may comprise individual sensor information. FIG. 3 shows three sensors 302A, 302B, and 302C for illustration only. More of fewer sensors may be used depending on a type and a configuration of a device including types and number of sensors coupled to the device. Individual sensors may provide information indicative of a current context of a device. However, individual sensor information may not be conclusive in determining that the device is currently within the given context. For example, a light sensor may be used to infer if a mobile phone may be in a pocket of a user. Using information output by the light sensor may not be enough to determine conclusively that the mobile phone may be in the pocket of the user. The light sensor may detect a small amount of light or no light, which may indicate that the mobile phone may be in the pocket of the user but may also indicate that the phone may be resting on a surface in a dark environment. Thus, individual sensor level inference may not be conclusive.

A probability inference level 304 may use information output by individual sensors to infer that the device is currently within the given context. The probability inference level 304 may use information output by one sensor and determine a probability with which the information output by the sensor may indicate that the device may currently be in the given context. The probability may not exceed a threshold and the device may not be determined to be currently in the given context conclusively. The probability inference level 304 may use information output by a second sensor and determine a combined probability with which information output by the two sensors combined may indicate the device is currently within the given context. In one example, the probability inference level 304 may continue to use information output by more sensors, sequentially or in parallel, with increasing probability and increasing rate of power consumption until the device may be determined to be currently within the given context with a predetermined level of accuracy.

A temporal statistical inference level 306 may further use information from the probability inference level 304 to determine that the device is currently within the given context. The temporal statistical inference level 306 may include an inference model based on algorithms such as Viterbi alignment, Partially Observable Markov Decision Process, and Naïve Bayes Classification. The inference model may consider individual sensors as individual elements and different contexts of the device as different states. The inference model may assume that each sensor output may be independent from outputs of other sensors and that sensor outputs contribute independently to a probability of a state or a context of the device.

Figure 4:
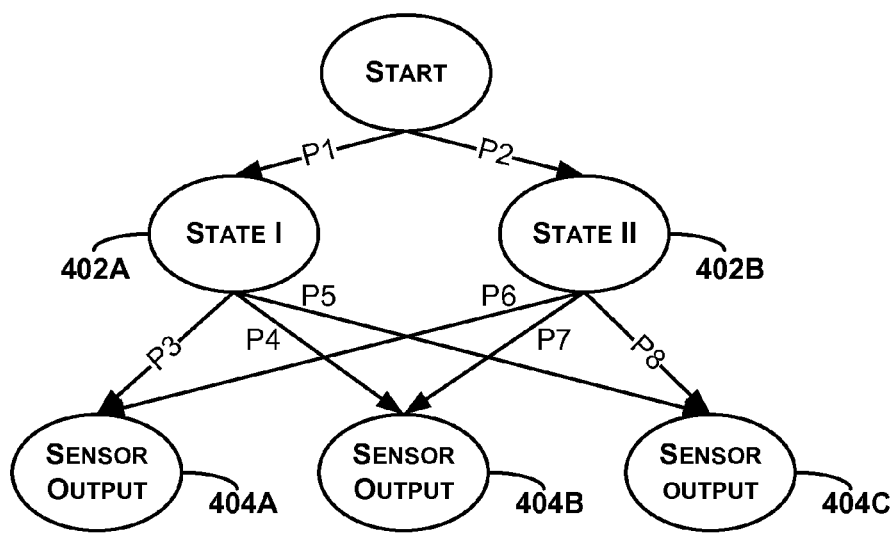
FIG. 4 is a block diagram illustrating an example temporal statistical inference diagram to infer that the device is currently within the given context.

FIG. 4 is a block diagram illustrating an example temporal statistical inference diagram to infer that the device is currently within the given context. States 402A and 402B may, for example, be two possible contexts of the device. For example, the device may be a mobile phone in a pocket of a user, state I 402A, or may be out of the pocket of the user, state II 402B. The states or possible contexts of the device may be considered as hidden or unobserved states that can be determined from observable information associated with sensor output conditions or values 404A-C. The sensor output values or conditions 404A-C may, for example, include three output conditions or output values of a camera coupled to the mobile phone. FIG. 4 shows three discrete output values 404A-C for a sensor for illustration only. Number of output values may depend on a type of the sensor. Output values may, for example, be represented by discrete numerical values. As an example, the output values of a camera may be normalized to be a value between 0 and 1. The three output values 404A-C may, for example, be 0.2, 0.5, and 0.8. In another example, qualitative descriptions associated with the output of the camera may be used such as "dark".

Probabilities P1 and P2 may include a starting probability or an average likelihood of a device being in a given state. For example, if the device on average may be in state 402A 60% of the time, and may be in state 402B 40% of the time, then P1 may be 0.6 and P2 may be 0.4. Probabilities P3-P8 may be referred to as emission probabilities. For example, if the sensor with output values 404A-C is a camera coupled to a mobile phone and state I 402A is the state of the mobile phone being in the pocket of the user, then P5 may represent a probability or a likelihood that when the mobile phone is in state I 402A, the camera output is 404C. Sensor output 404C may be "dark", or a numerical value representing an amount of light, for example.

The example temporal statistical inference method may determine a probability associated with the device being in a given unobserved state (e.g., 402A or 402B) of the device by observing or receiving information associated with a sensor output (e.g., 404A-C). For example, upon starting the algorithm, an observed state or sensor output value or condition 404C may indicate with a probability (P1×P5) that the device may currently be within the context or the state I 402A. The temporal statistical inference level 306 in FIG. 3 may include performing such calculations over time, filtering noise and distortions, and determining a probability that the device may currently be within a given state. Calculations may be performed for one sensor at a time or combine or cascade information output by other sensors to determine with increasing probability that the device is currently within the given context.

Probabilities P1-P8 in FIG. 4 may be determined by training For example, a number of experiments may be conducted where the device may be positioned in different possible states or contexts and corresponding sensor output values or conditions may be recorded. A Gaussian distribution may be created for recorded output values to determine an average and a variance of the sensor output values for the different states or contexts of the device. Based on the average and variance, probabilities can be determined or assigned. Using the Gaussian distribution determined from the experiments, a probability of the device being in a given state may be determined or assigned given a sensor output value.

IV. Example Systems and Computer Program Products

Figure 5:
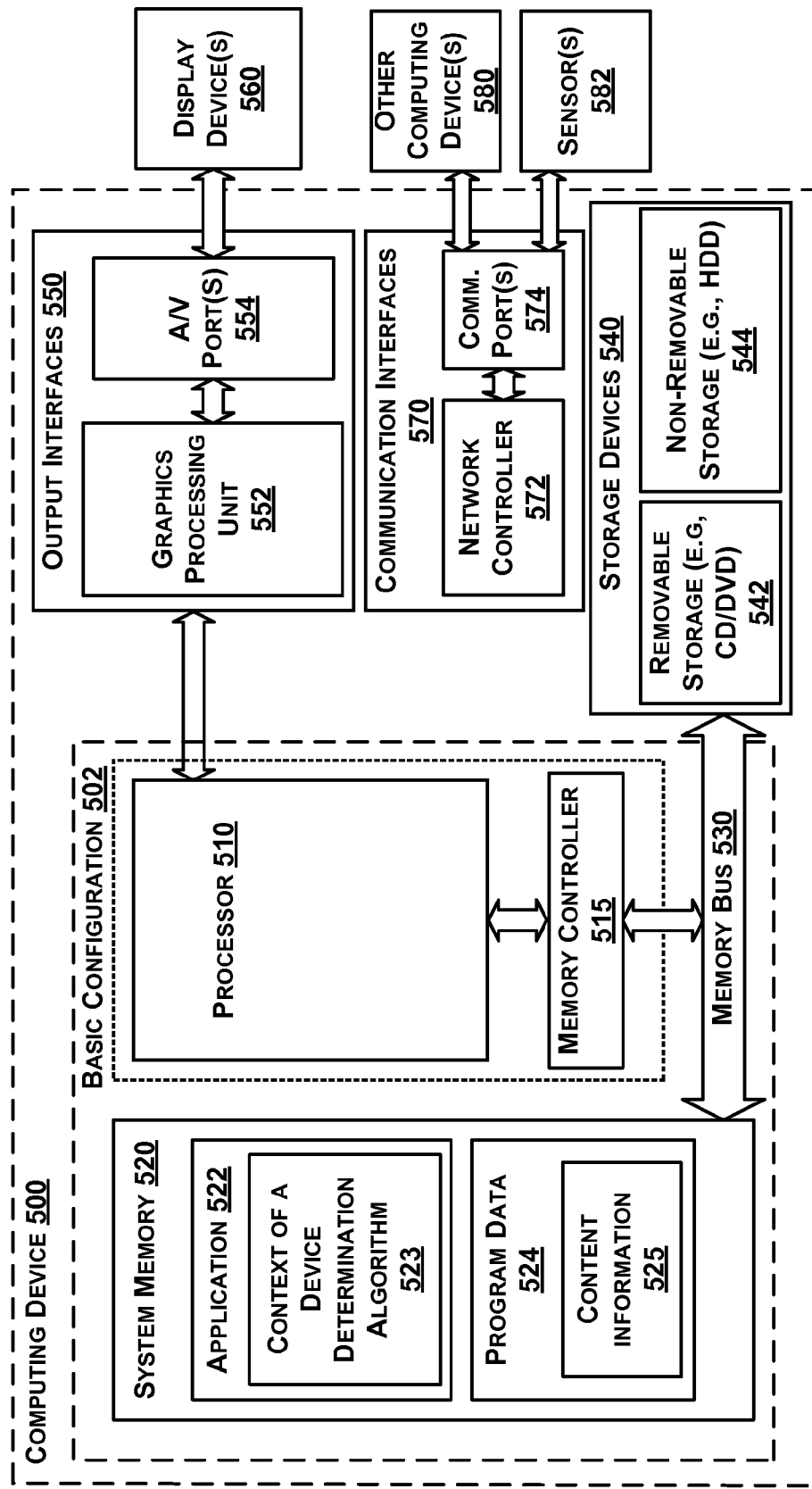
FIG. 5 is a functional block diagram illustrating an example computing device used in a computing system that is arranged in accordance with at least some embodiments described herein.

FIG. 5 is a functional block diagram illustrating an example computing device 500 used in a computing system that is arranged in accordance with at least some embodiments described herein. The computing device may be a personal computer, mobile device, cellular phone, video game system, or global positioning system, and may be implemented as a client device, a server, a system, a combination thereof, or as a portion of components described in FIG. 1. In a basic configuration 502, computing device 500 may include one or more processors 510 and system memory 520. A memory bus 530 can be used for communicating between the processor 510 and the system memory 520. Depending on the desired configuration, processor 510 can be of any type including but not limited to a microprocessor (µP), a microcontroller (µC), a digital signal processor (DSP), or any combination thereof. A memory controller 515 can also be used with the processor 510, or in some implementations, the memory controller 515 can be an internal part of the processor 510.

Depending on the desired configuration, the system memory 520 can be of any type including but not limited to volatile memory (such as RAM), non-volatile memory (such as ROM, flash memory, etc.) or any combination thereof. System memory 520 may include one or more applications 522, and program data 524. Application 522 may include context of a device determination algorithm 523 that is arranged to provide inputs to the electronic circuits, in accordance with the present disclosure. Program Data 524 may include content information 525 that could be directed to any number of types of data. In some example embodiments, application 522 can be arranged to operate with program data 524 on an operating system.

Computing device 500 can have additional features or functionality, and additional interfaces to facilitate communications between the basic configuration 502 and any devices and interfaces. For example, data storage devices 540 can be provided including removable storage devices 542, non-removable storage devices 544, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer readable instructions, data structures, program modules, or other data.

System memory 520 and storage devices 540 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media can be part of device 500.

Computing device 500 can also include output interfaces 550 that may include a graphics processing unit 552, which can be configured to communicate to various external devices such as display devices 560 or speakers via one or more A/V ports 554 or a communication interface 570. The communication interface 570 may include a network controller 572, which can be arranged to facilitate communications with one or more other computing devices 580 and one or more sensors 582 over a network communication via one or more communication ports 574. The one or more sensors 582 are shown external to the computing device 500, but may also be internal to the device. The communication connection is one example of a communication media. Communication media may be embodied by computer readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

Computing device 500 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 can also be implemented as a personal computer including both laptop computer and non-laptop computer configurations.

In some embodiments, the disclosed methods may be implemented as computer program instructions encoded on a computer-readable storage media in a machine-readable format, or on other non-transitory media or articles of manufacture. FIG. 6 is a schematic illustrating a conceptual partial view of an example computer program product 600 that includes a computer program for executing a computer process on a computing device, arranged according to at least some embodiments presented herein. In one embodiment, the example computer program product 600 is provided using a signal bearing medium 601. The signal bearing medium 601 may include one or more program instructions 602 that, when executed by one or more processors may provide functionality or portions of the functionality described above with respect to FIGS. 1-5. Thus, for example, referring to the embodiments shown in FIG. 2, one or more features of blocks 202-214 may be undertaken by one or more instructions associated with the signal bearing medium 601. In addition, the program instructions 602 in FIG. 6 describe example instructions as well.

In some examples, the signal bearing medium 601 may encompass a computer-readable medium 603, such as, but not limited to, a hard disk drive, a Compact Disc (CD), a Digital Video Disk (DVD), a digital tape, memory, etc. In some implementations, the signal bearing medium 601 may encompass a computer recordable medium 604, such as, but not limited to, memory, read/write (R/W) CDs, R/W DVDs, etc. In some implementations, the signal bearing medium 601 may encompass a communications medium 605, such as, but not limited to, a digital and/or an analog communication medium (e.g., a fiber optic cable, a waveguide, a wired communications link, a wireless communication link, etc.). Thus, for example, the signal bearing medium 601 may be conveyed by a wireless form of the communications medium 605 (e.g., a wireless communications medium conforming to the IEEE 802.11 standard or other transmission protocol).

The one or more programming instructions 602 may be, for example, computer executable and/or logic implemented instructions. In some examples, a computing device such as the computing device 500 of FIG. 5 may be configured to provide various operations, functions, or actions in response to the programming instructions 602 conveyed to the computing device 500 by one or more of the computer readable medium 603, the computer recordable medium 604, and/or the communications medium 605.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
    determining, for each sensor of a subset of sensors coupled to a device, a respective rate of power consumption for that sensor;
    determining, for each sensor of the subset of sensors, a respective accuracy score indicating a degree to which information associated with that sensor is indicative of a given context;
    for each sensor of the subset of sensors, determining a sensor utility value for that sensor, each respective sensor utility value being based at least in part on the respective rate of power consumption for that sensor and the respective accuracy score for that sensor;
    identifying, based on the sensor utility value for each sensor of the subset of sensors, a given sensor;
    receiving information output by the given sensor;
    determining, based on the information output by the given sensor, a probability that the device is currently within the given context; and
    determining, by a processor, that the device is currently within the given context when the probability exceeds a predetermined threshold.

2. The method of claim 1, wherein the given sensor is a first sensor, the probability is a first probability, and the predetermined threshold is a first predetermined threshold, the method further comprising:
    when the first probability does not exceed the first predetermined threshold: (i) identifying, based on the sensor utility value for each sensor of the subset of sensors, a second sensor, (ii) receiving information output by the second sensor, (iii) determining, based on the information output by the second sensor, a second probability that the device is currently within the given context, (iv) combining the first probability and the second probability, and (v) determining that the device is currently within the given context when the combined probability exceeds a second predetermined threshold.

3. The method of claim 2, wherein the respective rate of power consumption for the first sensor is lower than the respective rate of power consumption for the second sensor.

4. The method of claim 2, wherein the second probability is higher than the first probability.

5. The method of claim 2, wherein combining the first probability and the second probability comprises determining a weighted combination of the first probability and the second probability, and wherein weights associated with the weighted combination of the first probability and the second probability vary in correlation with an input to the device.

6. The method of claim 5, wherein the weights vary in correlation with a configuration of the device, and wherein the configuration of the device includes types and number of sensors coupled to the device.

7. The method of claim 1, wherein the sensor utility value for each sensor includes a weighted combination of the respective rate of power consumption for that sensor and the respective accuracy score for that sensor, and wherein weights associated with the weighted combination of the respective rate of power consumption and the respective accuracy score vary in correlation with an input to the device.

8. The method of claim 1, further comprising:
based on each sensor utility value for each respective sensor, ranking the subset of sensors based on each respective rate of power consumption for each respective sensor.

9. The method of claim 1, wherein each respective accuracy score varies in correlation with an input to the device.

10. A non-transitory computer readable medium having stored thereon instructions executable by a computing device to cause the computing device to perform functions comprising:
determining, for each sensor of a subset of sensors coupled to a device, a respective rate of power consumption for that sensor;
determining, for each sensor of the subset of sensors, a respective accuracy score indicating a degree to which information associated with that sensor is indicative of a given context;
for each sensor of the subset of sensors, determining a sensor utility value for that sensor, each respective sensor utility value being based at least in part on the respective rate of power consumption for that sensor and the respective accuracy score for that sensor;
identifying, based on the sensor utility value for each sensor of the subset of sensors, a given sensor;
receiving information output by the given sensor;
determining, based on the information output by the given sensor, a probability that the device is currently within the given context; and
determining that the device is currently within the given context when the probability exceeds a predetermined threshold.

11. The non-transitory computer readable medium of claim 10, wherein the given sensor is a first sensor, the probability is a first probability, and the predetermined threshold is a first predetermined threshold, and wherein the instructions are further executable by the computing device to cause the computing device to perform functions comprising:
when the first probability does not exceed the first predetermined threshold: (i) identifying, based on the sensor utility value for each sensor of the subset of sensors, a second sensor, (ii) receiving information output by the second sensor, (iii) determining, based on the information output by the second sensor, a second probability that the device is currently within the given context, (iv) combining the first probability and the second probability, and (v) determining that the device is currently within the given context when the combined probability exceeds a second predetermined threshold.

12. The non-transitory computer readable medium of claim 10, wherein the instructions are further executable by the computing device to cause the computing device to perform functions comprising determining that the device is currently within a context that describes an area where a user is not making use of the device.

13. The non-transitory computer readable medium of claim 12, wherein the instructions are further executable by the computing device to cause the computing device to perform functions comprising:
based on determining that the device is currently within a context that describes the area where the user is not making use of the device, disabling at least one sensor coupled to the device.

14. The non-transitory computer readable medium of claim 12, wherein the instructions are further executable by the computing device to cause the computing device to perform functions comprising:
based on determining that the device is currently within a context that describes the area where the user is not making use of the device, reducing functionality of the device.

15. The non-transitory computer readable medium of claim 10, wherein the sensor utility value for each sensor includes a weighted combination of the respective rate of power consumption for that sensor and the respective accuracy score for that sensor, and wherein weights associated with the weighted combination of the respective rate of power consumption and the respective accuracy score vary in correlation with an input to the device.

16. A system comprising:
a utility function module configured to receive, for each sensor of a subset of sensors coupled to a device, information associated with a respective rate of power consumption for that sensor, and, for each sensor of the subset of sensor, a respective accuracy score indicating a degree to which information associated with that sensor is indicative of a given context, wherein the utility function module is further configured to determine a sensor utility value for each sensor of the subset of sensors, each respective sensor utility value being based at least in part on the respective rate of power consumption for that sensor and the respective accuracy score for that sensor; and
a probability module in communication with the utility function module configured to identify, based on the sensor utility value for each sensor of the subset of sensors, a given sensor, receive information output by the given sensor, and determine, based on the information output by the given sensor, a probability that the device is currently within the given context, wherein the probability module is configured to determine that the device is currently within the given context when the probability exceeds a predetermined threshold.

17. The system of claim 16, wherein the given sensor is a first sensor, the probability is a first probability, and the predetermined threshold is a first predetermined threshold, and wherein the probability module is further configured to:
when the first probability does not exceed the first predetermined threshold: (i) identify, based on the sensor utility value for each sensor of the subset of sensors, a second sensor, (ii) receive information output by the second sensor, (iii) determine, based on the information output by the second sensor, a second probability that the device is currently within the given context, (iv) combine the first probability and the second probability, and (v) determine that the device is currently within the given context when the combined probability exceeds a second predetermined threshold.

18. The system of claim 16, further comprising a temporal statistical inference module, in communication with the utility function module and the probability module, configured to determine the probability associated with the device being in the given context given information output by the given sensor, wherein the probability comprises at least an emission probability including a likelihood of the device being currently within the given context given the information output by the given sensor.

19. The system of claim 18, wherein the temporal statistical inference module is further configured to combine information output by multiple sensors and emission probabilities associated with the multiple sensors to determine with an increased probability that the device is currently within the given context.

20. The system of claim 18, wherein the probability comprises a multiplication of a starting probability and the emission probability, wherein the starting probability comprises an average probability of the device being currently within the given context.

21. The system of claim 18, wherein the probability module determines the emission probability by training a machine learning system, and wherein the training comprises:
   positioning the device in the given context;
   receiving information output by each sensor of the subset of sensors over time; and
   determining a statistical distribution including an average and a variance for the output of each sensor.

22. The system of claim 16, wherein the probability module is configured to disable at least one sensor coupled to the device and to reduce the functionality of the device when the device is currently within a context that describes an area where a user is not making use of the device.

23. The system of claim 16, wherein the probability module is configured to enable at least one sensor coupled to the device and to increase the functionality of the device when the device is currently within a context that describes an area where a user is making use of the device.

* * * * *